No. 806,260. PATENTED DEC. 5, 1905.
S. D. JOHNSTON.
SEED PLANTER.
APPLICATION FILED APR. 17, 1905.
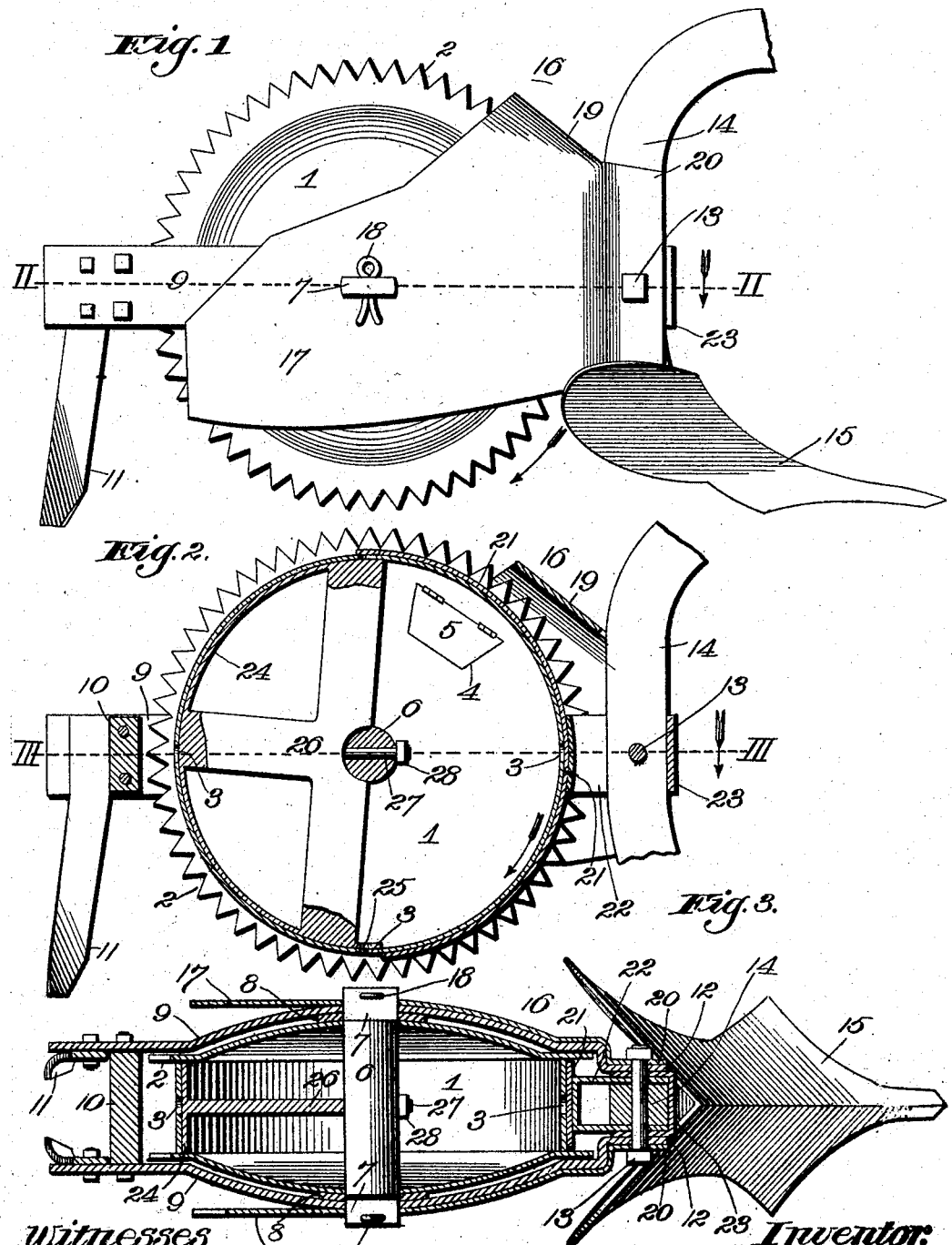

UNITED STATES PATENT OFFICE.

SAMUEL D. JOHNSTON, OF WELLBORN, OKLAHOMA TERRITORY.

SEED-PLANTER.

No. 806,260.　　　　Specification of Letters Patent.　　　　Patented Dec. 5, 1905.

Application filed April 17, 1905. Serial No. 256,145.

*To all whom it may concern:*

Be it known that I, SAMUEL D. JOHNSTON, a citizen of the United States, residing at Wellborn, in the county of Beaver and Territory of Oklahoma, have invented certain new and useful Improvements in Seed-Planters, of which the following is a specification.

My invention relates to seed-planters, and more especially to that type embracing a lister-plow to make the furrow and a rotary hopper to discharge the seed in the furrow made by the plow.

My object is to produce seed-dropping devices of the character mentioned which operate efficiently and reliably and which are of simple, strong, durable, and inexpensive construction.

To this end the invention consists in certain novel and peculiar features of construction and combinations of parts, as hereinafter described and claimed, and in order that it may be fully understood reference is to be had to the accompanying drawings, in which—

Figure 1 is a side view of a seed-planting mechanism embodying my invention. Fig. 2 is a vertical longitudinal section of the same, and Fig. 3 is a horizontal section taken on the line III III of Fig. 1.

In the said drawings, 1 designates a hollow wheel having its sides of greater diameter than its rim and peripherally notched or toothed, as at 2, and having a series of equidistant holes 3 in said rim. In one side the wheel is provided with an opening 4, normally closed by a suitable door 5, this door-opening being for the purpose of permitting the "wheel-hopper," as it is hereinafter termed, to be charged with the seed to be planted.

The wheel-hopper is journaled on a shaft or axle 6, having its ends flattened, as at 7, and fitting on said flattened ends against the outer sides of the wheel are washers 8. A frame for supporting said shaft non-rotatably comprises the side bars 9, engaging the flattened portions of the shaft outward of the washers. Rearward of the wheel-hopper said bars are connected by a cross-brace 10 and rearward of said brace are equipped with depending coverers 11 of the usual or any preferred type, these coverers serving to turn the soil inward over the seed, as will be readily understood.

Forward of the wheel-hopper the bars 9 are bent inward and then forward, as at 12, said bent or angular portions being mounted on a bolt 13, carried by the beam 14, of a lister-plow or equivalent soil-turning device 15.

16 designates a guard consisting of two similar side portions 17, fitting non-rotatably upon the flattened ends of the shaft outward of the bars 9 and secured in such position by spring-cotters 18, extending through said flattened ends of the shaft. The side portions of the guard are united above the forward portion of the wheel-hopper by a bridging portion 19 and forward of the latter terminate in bent or angular portions 20, secured upon bolt 14 snugly against the outer sides of the angular portions of bars 9. This guard is for the purpose of permitting the wheel-hopper to operate with a minimum of friction by preventing the loose soil turned by the plow from piling up in any material volume against the opposite sides of the wheel-hopper.

21 designates a semicircular guard which externally embraces the forward half of the wheel-hopper rim, extending, preferably, from a point slightly rearward of the vertical plane of shaft 6 and terminating by preference slightly forward of the vertical axis of said shaft. This guard is provided with a U-shaped clip 22, which externally embraces the plow-beam and is secured upon the bolt 13, a clip 23, also mounted on said bolt, being interposed between said clip 22 and the angular portions of bars 9.

Fitting snugly within the rear half of the wheel-hopper is a semicircular guard or shield 24, its upper end terminating forward of the vertical plane of the axis of the shaft and its lower end in a bifurcation 25 in the vertical plane of such axis and slightly rearward of the lower end of the external guard 21, so that as the wheel-hopper revolves in the direction indicated by the arrow the holes 3 shall successively register with said bifurcated end 25 of the internal shield or guard, one or more seeds escaping through said registering hole before it is closed by passing rearwardly beyond the bifurcated end of the internal guard or shield, the wheel-hopper, of course, revolving through the frictional engagement of its teeth 2 with the ground as the machine is drawn across the field, the coverers, as hereinbefore stated, turning the loose soil inward, and thereby burying the seed to the proper depth.

The internal shield or guard is provided with a skeleton rib 26, fitting against shaft 6, and also with a bolt portion 27, extending through said shaft and engaged by a clamping-nut 28, this arrangement insuring a rigid relation between the stationary shaft and internal guard.

From the above description it will be apparent that I have produced a seed-planter embodying the features of advantage enumerated as desirable in the statement of the object of the invention and which obviously is susceptible of some change without departing from the principle of construction involved.

Having thus described the invention, what I claim as new, and desire to secure by Letters Patent of the United States, is—

1. A seed-planter, comprising a support, a frame carried thereby, a shaft carried by said frame and fixed with relation thereto, a wheel-hopper journaled on the shaft within said frame, and provided with toothed enlargements or flanges to engage the ground, and also with perforations in its rim between said flanges, a frame secured to the support and disposed at the outer sides of said first-named frame and engaging and having a fixed relation to said shaft and having its lower edges terminating some distance above the lower edge of the wheel-hopper, and adapted to protect the latter against the accumulation against its sides of an undue quantity of soil, a lister-plow carried by said support forward of the wheel-hopper, coverers depending from the rear end of the first-named frame and in line with the plow and wheel-hopper, an external shield or guard carried by said support and snugly embracing the forward half of the rim of the wheel-hopper, and an internal shield or guard fitting snugly against the rear half of the inner side of the rim and rigidly secured to said shaft and terminating at its lower end in a notch which registers with said peripheral opening of said wheel-hopper when the latter is about vertically below the shaft and rearward of the lower end of the external shield or guard.

2. A seed-planter, comprising a wheel-hopper having its rim provided with holes at equidistant points, and having toothed enlargements or flanges to engage the ground, a stationary shaft forming a journal for said wheel-hopper, an internal shield or guard fitting snugly against the rear half of the inner side of the rim and rigidly secured to said shaft, a frame or support holding the shaft non-rotatably and provided with coverers at its rear end, a beam forward of the wheel-hopper, means securing said frame or support to the beam, an external shield or guard supported from said beam and snugly embracing the forward half of the rim of the wheel-hopper, and a guard secured to the beam and to the stationary shaft and disposed at opposite sides of the wheel-hopper to prevent the accumulation of an undue quantity of soil thereagainst.

In testimony whereof I affix my signature in the presence of two witnesses.

SAMUEL D. JOHNSTON.

Witnesses:
    DANIEL T. QUINLAN,
    JAMES N. AKINS.